United States Patent [19]
LaChapelle et al.

[11] Patent Number: 5,568,262
[45] Date of Patent: Oct. 22, 1996

[54] NON-DESTRUCTIVE FILL VOLUME MEASUREMENT SYSTEM

[76] Inventors: Joseph G. LaChapelle, 32650 Joseph La., Philomath, Oreg. 97370; Cary S. Kiest, 6139 Nelsen Pl. SW., Albany, Oreg. 97321

[21] Appl. No.: 251,332

[22] Filed: May 31, 1994

[51] Int. Cl.$^6$ ............................................. G01B 11/00
[52] U.S. Cl. .................... 356/379; 356/427; 250/559.21; 250/577
[58] Field of Search ..................... 356/379, 380, 356/427, 240; 250/223 B, 559.21, 577; 348/127

[56] References Cited

U.S. PATENT DOCUMENTS

| | | | |
|---|---|---|---|
| 4,605,851 | 8/1986 | Ometz et al. | 356/427 |
| 4,733,095 | 3/1988 | Kurahashi et al. | 250/577 |
| 5,073,720 | 12/1991 | Brown | 250/577 |
| 5,092,170 | 3/1992 | Hønstvet | 73/295 |
| 5,095,204 | 3/1992 | Novini | 250/223 |

*Primary Examiner*—Richard A. Rosenberger

[57] ABSTRACT

Fill volume of a liquid in a sealed, transparent container is determined by rotating the container about a transverse axis so as to confine the air to a generally cylindrical air pocket about the transverse axis of rotation. Machine vision methods and apparatus are used to capture an image of the container, including the air pocket, for measuring the size of the air pocket. A common volume of the container is defined as a generally cylindrical region intermediate upright and inverted liquid levels. The common volume and the air pocket volume are used to determine the liquid fill volume so that all measurements are acquired in a central portion of the container having a regular geometric shape.

30 Claims, 10 Drawing Sheets

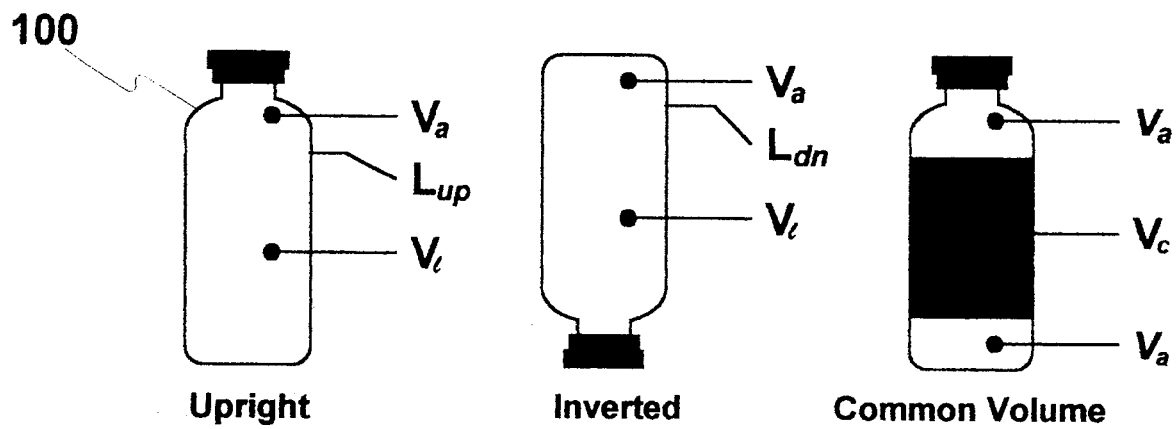
Upright     Inverted     Common Volume
Fig. 1A     Fig. 1B     Fig. 1C
Where: $V_t = 2V_a + V_c$ and $V_\ell = V_a + V_c$
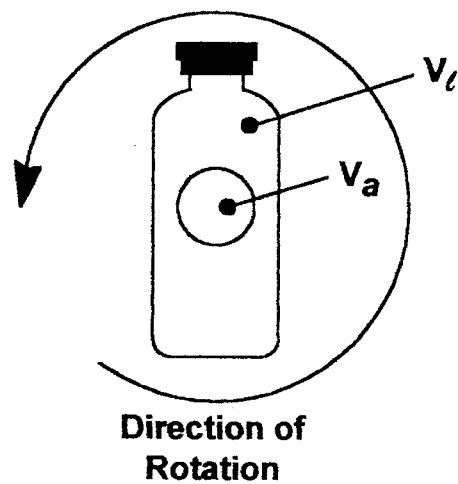
Direction of Rotation
Fig. 2

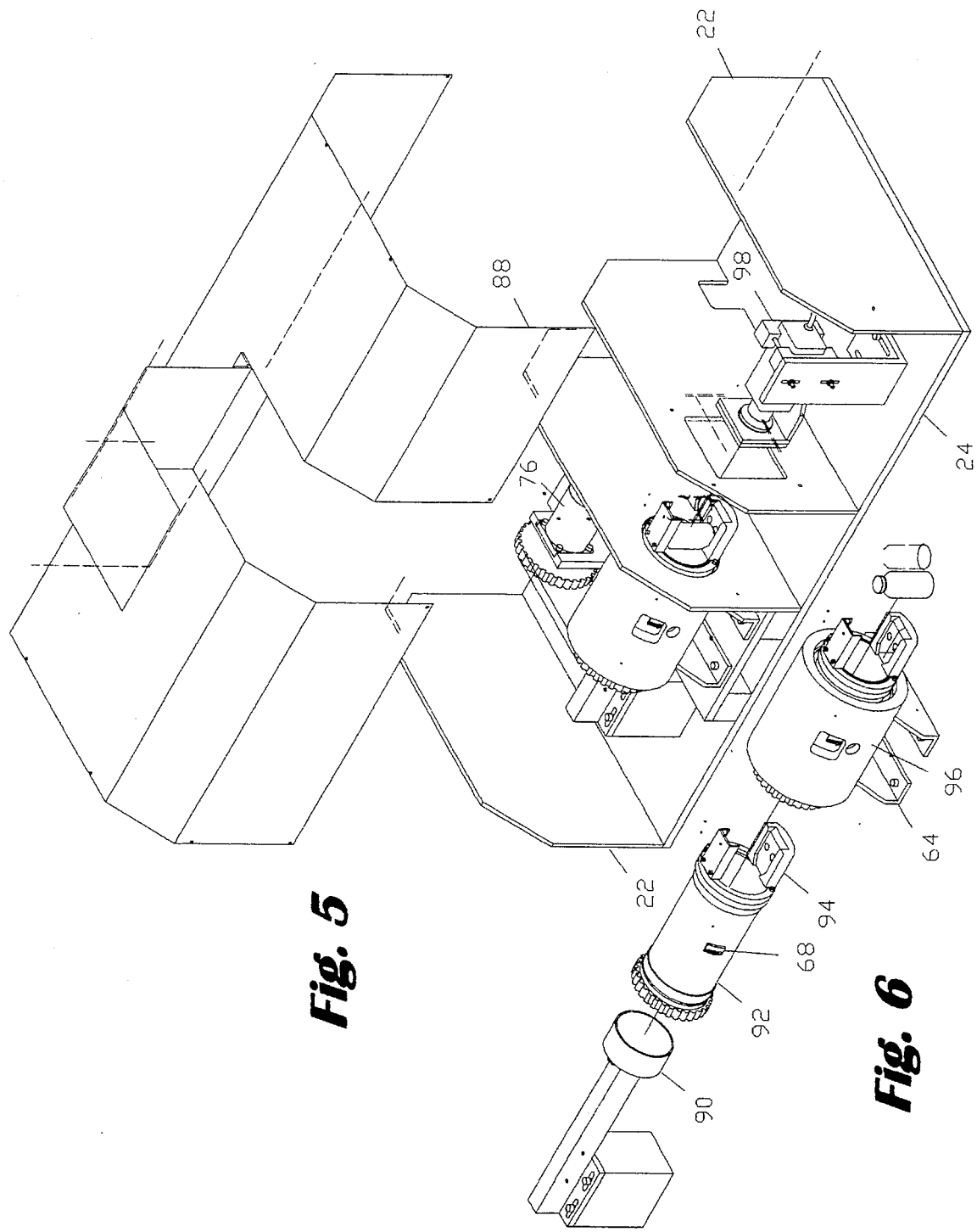

NON-DESTRUCTIVE FILL VOLUME MEASUREMENT SYSTEM

FIELD OF THE INVENTION

The present invention relates to methods and apparatus for non-destructive measurement of fill volume in generally transparent containers, such as a glass vial. More specifically, the present invention relates to highly accurate methods and apparatus for measuring liquid fill volume inside a sealed container without removing its contents or otherwise compromising its salability.

BACKGROUND OF THE INVENTION

In the pharmaceutical industry, parenteral drugs, such as drugs intended for intravenous or intramuscular injection, are typically packaged in small glass vials. Crimp-top vials are used for injectibles. Small glass ampoules may be used for packaging single doses of hypodermic medicines. Glass vial sizes are typically in a range of 1 to 1,000 ml and may be of molded or tubular varieties.

For years, pharmaceutical manufacturers have lost millions of dollars worth of parenteral drugs through destructive testing intended to verify correct fill volume from their automatic vial filling equipment. Such waste gives rise to opportunity for increased yield and profitability where a non-destructive alternative can be found. Thus, what it is needed is a way to accurately measure liquid volume inside a sealed, glass vial without removing its contents or otherwise violating its salability.

Automatic filling machines are found in most high volume, parenteral drug packaging operations. They use microprocessor-based controls and precision components to accurately package liquid pharmaceuticals at rates of 300 vials per minute on a single filling line. For an industry that demands exacting quality control, filling machines offer consistent, economical operation unmatched by manual alternatives.

Because filling machines contain and interact with time-varying elements, they must include closed-loop control systems to maintain consistent fill volume. Control feedback is typically received from volume measurements performed on vials that have recently been filled. When volume measurements reveal deviation from the target volume, corrective action is taken hopefully before product specifications are violated. On the other hand, if volume measurements reveal fill volumes outside of predetermined tolerance, all of the incorrectly filled or even suspect vials generally are destroyed.

Many existing filling lines do not measure fill volume automatically. Instead, it is common practice to manually select a vial from each fill nozzle, periodically, for example every few minutes, remove its contents and measure them by gravimetric or volumetric means. Because a liquid is removed from the vial before measurement, this method almost always results in product destruction.

For most of today's drugs the economic impact to the producer is significant. Destructive testing costs range from a few hundred to a few thousand dollars each week depending on product value. With the emergence of increasingly expensive drugs and the escalating pressure on the industry to lower prices, the need is increasingly important to gain competitive advantage through non-destructive measurement techniques.

SUMMARY OF THE INVENTION

In view of the foregoing background, it is an object of the present invention to reduce waste in parenteral drug packaging by providing a non-destructive fill volume measurement system.

Another object of the invention is to make it practical to measure fill volume more frequently than in prior practice. More frequent measurement has the benefits of facilitating tighter control over the filling process for a more uniform product and less waste.

Another object of the invention is to measure filled vials after they are capped and sealed, to enable recovery of portions of a run or quarantined lots for which fill volume data is unavailable or questionable.

Another object of the invention is to substantially automate fill volume measurement so that the cost of operation is minimized.

A further object of the invention is to measure fill volume with an accuracy on the order of 0.1 to 2.0% of the total volume and to record such volumes electronically for subsequent review and use.

Another object of the invention is to provide for measuring fill volume under control of a personal computer having a user interface that is easy to learn and use.

A further object is to overcome inaccuracies in volume measurement that arise from variations in the size and shape of glass vials.

Yet another object is to minimize errors that arise from variations in the vial formation by forcing liquid and air to occupy distinct regions that are relatively easy to observe and calculate.

A further object is to make all optical measurements through a cylindrical portion of a vial where image distortion is minimized.

Accordingly, one aspect of the present invention is a non-destructive method of determining a fill volume of a first fluid in a sealed container that also contains a second fluid. The second fluid is understood to have a lower density than the first fluid. The container is understood to have a substantially symmetrical central region, i.e. a region intermediate the top and bottom ends. The top and/or bottom ends of the container may be necked or otherwise irregular. The method includes determining a "common volume" within the central portion of the container. The common volume is defined as intermediate an "upright fluid level" and an "inverted fluid level," such that the first fluid fill volume equals a sum of the second fluid volume plus the common volume. Accordingly, the method further calls for determining the second fluid volume; and then summing the second fluid volume and the common volume to determine the first fluid fill volume. The first fluid may be, for example, a liquid such as a parenteral drug, and the second fluid may be air. However, any fluid can be measured using the apparatus and methods described herein.

The second fluid volume, for example air, is determined by rotating the container about a predetermined transverse axis of rotation so as to confine the second fluid to the central region of the container surrounding the axis of rotation, and measuring the second fluid volume within the central region while the container is rotating. In this way, measurement is simplified because the irregular ends of the container are avoided. For example, if the container is cylindrical within the central region, the "common volume" will define a cylinder, and the air volume will define a smaller, transverse cylinder (called a "pocket") within the common volume.

Calculation of these volumes can proceed according to known geometric relationships.

The speed of rotation is selected such that the second fluid volume forms a stable, substantially cylindrical pocket symmetrically disposed about the axis of rotation, the pocket being substantially surrounded by the first fluid. The second fluid volume is determined by measuring the dimensions of the pocket while the container is so rotating. The speed of rotation to achieve a stable pocket depends upon the fluids, and generally will be in a range of 200 to 7000 rpm.

Measurements of the upright and inverted fluid levels are done in the preferred embodiment by providing a machine vision system including an electronic imaging means, for example a camera, for capturing an image of the pocket along the axis of rotation. The pocket is measured, using image processing means, from an image of the container captured while the container is rotating.

The inside diameter of the container (in the central region) must be determined to determine volume. This can be done by measuring the outside diameter and deducting the container wall thickness. The outside diameter can be measured either manually or using the machine vision system as further described below. The wall thickness also can be predetermined from manufacturer specifications, measured manually or measured with machine vision techniques further described below.

More specifically, the disclosed method includes positioning the container in an upright orientation; measuring the upright fluid level at a first interface of the first fluid and the second fluid; inverting the container; and then measuring the inverted fluid level at a second interface of the first fluid and the second fluid. In the preferred embodiment, the method further includes directing a source of electromagnetic radiation having a desired wavelength through the container toward the camera; and filtering electromagnetic radiation entering the camera so that only electromagnetic radiation having substantially the desired wavelength enters the imaging means. While infrared light is preferred for measuring fluids in glass vials, other radiation such as x-ray may be used in connection with containers that are substantially transparent to such radiation.

The foregoing and other object's, features and advantages of the invention will become more readily apparent from the following detailed description of a preferred embodiment which proceeds with reference to the drawings.

BRIEF DESCRIPTION OF THE DRAWINGS

FIG. 1A illustrates a partially liquid-filled vial in an upright orientation.

FIG. 1B illustrates the vial of FIG. 1A in an inverted orientation.

FIG. 1C illustrates the vial of FIG. 1A showing common volume.

FIG. 2 illustrates an air cylinder formed while the vial of FIG. 1A is rotated about a predetermined transverse axis.

FIG. 5 is a perspective view illustrating mechanical components of a fill measurement system according to one commercial embodiment of the invention, with a centrifuge cover raised to expose the internal components.

FIG. 6 is an exploded perspective view of selected subassembly portions of the fill measurement system of FIG. 5.

DETAILED DESCRIPTION OF THE PREFERRED EMBODIMENT

It is known in the prior art to measure fill volume by simply measuring a fill level, and inferring the fill volume from the level or height of the liquid in the container. However, variations in the vials can alter volume capacity by several percent, especially in molded vials where the distribution of glass is relatively uneven. Because of this, fill volume cannot be accurately calculated from a simple fill level measurement.

Attempts have been made to improve on simple level fill measurements by approximating the interior geometry of the vial base based on an optical image of the base. However, images are distorted as they pass through non-uniform glass surfaces and this method has proven too unreliable.

In general, visual voltage measurement based on liquid level inside an upright vial is inaccurate mainly because of differences in shape from one vial to the next. For example, variations in shape exist among vials in both bottom and top regions that make it quite difficult to determine liquid volume based solely on liquid level. These variations are larger than the desired measurement accuracy can afford to absorb. One feature of the present invention is to make all measurements within the central, e.g. cylindrical, region of the vial, so that the geometric surfaces would be more repeatable and easier to measure.

However, imperfections within the cylindrical region are responsible for remaining measurement error. Even within the cylindrical portion, actual irregularities can affect volume calculations by as much 0.2 mL in a typical drug vial such as a 40 mL size. In particular, variation exists in four criteria: roundness, straightness, taper and wall thickness. Roundness is a measure of radial error; straightness a measure of axial error; and taper a measure of dimensional error. Irregular glass wall thickness affects each of the other three, adding to their individual errors. For example, caliper measurements have shown irregularities of several thousands of an inch for roundness, straightness and taper, and on the order of 0.001" for wall thickness in some vials. Accordingly, it is necessary to measure the glass cylinder more carefully to improve accuracy. One technique for measuring the glass cylinder is laser scanning technique to map the inside surface of the cylindrical portion of a vial. In this technique, a laser light source such as a laser diode is reflected by a scanning mirror to illuminate one location on the vial at a time. A silhouette image of the vial is projected onto an opaque screen and a video camera receives an image of that screen. The laser and mechanical scanner method is difficult to implement, largely due to instability in the scanning mirror portion of the apparatus. The scanner might be replaced with passive, optical devices but this requires increased laser power, with the concomitant regulatory constraints.

Figure 8:
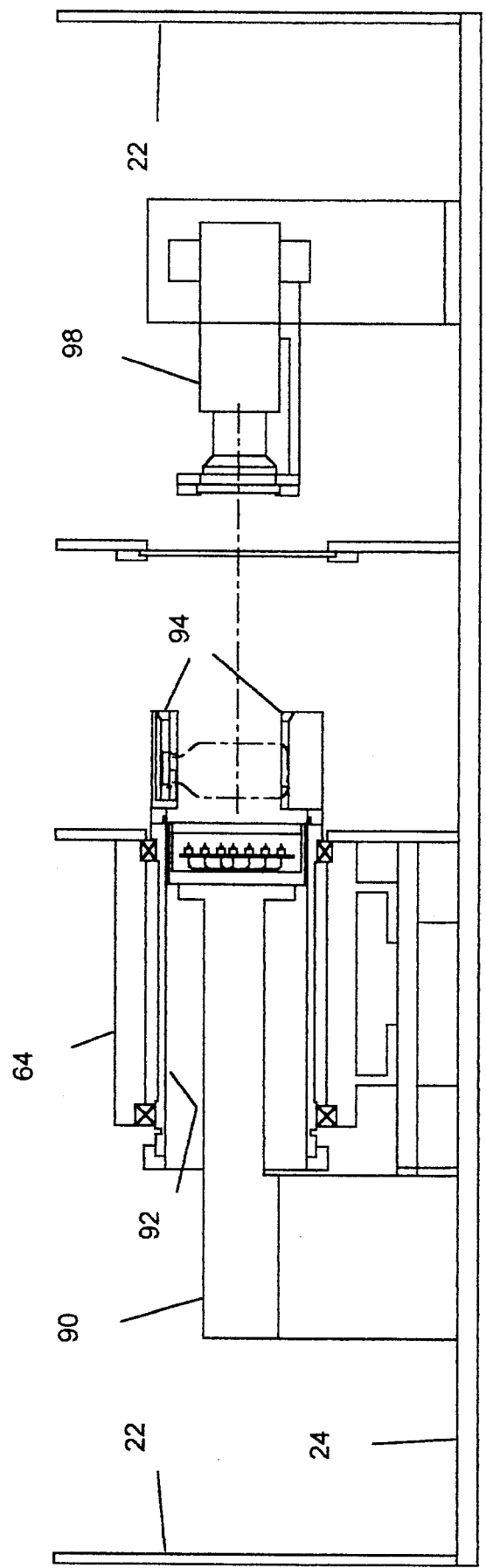
FIG. 8 is a cross-sectional view of the system of FIG. 5, taken along the centrifuge centerline.

It is preferable to use an infrared light source placed directly behind the vial. This design retains many desirable characteristics of the laser-based approach, without the instability of the scanner mechanism or the need for elaborate components. Rather than a silhouette projected onto a screen, the video camera views the vial directly as illustrated in FIG. 8.

Where the diameter measurements are performed with a vial in a fixed orientation, it is impossible to detect roundness errors or correct for them effectively. Accordingly, the operator interface (of a Host Program described below) allows a human operator to input diameter measurements manually. Mechanical calipers, for example, can be used to measure both a maximum and minimum diameters of the vial in the central region. This data can be taken into account in calculating fill volume. Accuracy can be improved albeit an increased cost and complexity by scanning the inside surface of the vial to determine its exact shape. Apparatus and methods for scanning the inside surface are described below.

Another source of error is the variation in the shape of the meniscus. In one operative embodiment, this value is derived through calibration and assumed to be constant. Improvements in accuracy can be achieved by the use of vision equipment capable of analyzing meniscus shape on each vial.

FIG. 1A illustrates a container, such as a parenteral drug vial, shown in an upright orientation. The container 100 is filled with a liquid up to a liquid level Lup (upright). The remainder of the container volume, i.e., that not occupied by the liquid, is occupied by a less dense fluid such as air, indicated by Va. The liquid volume is identified as Vl.

FIG. 1B shows the same vial as FIG. 1A but in an inverted orientation. The liquid Vl, having greater density, again occupies a lower portion of the container. Conversely, the air flows to the top, again indicated by Va. In the inverted orientation, the liquid fills the container to a level identified as Ldn (L-down). We refer hereinafter to this level as the inverted fluid level. The upright and inverted fluid levels, Lup and Ldn respectively, are each determined relative to a fixed origin. Thus, once determined, they do not change even though the container is rotated.

Referring now to FIG. 1C, a new "Common Volume" (Vc) is defined as the amount of liquid contained between the upright liquid level Lup and the inverted liquid level Ldn. The total volume of the container equals 2Va+the Common Volume (Vc) and, the volume of the liquid Vl equals Va+Vc.

Referring now to FIG. 2, the vial of FIG. 1A is rotated at high speed about an axis of rotation normal to the drawing sheet. The axis of rotation thus is transverse to the longitudinal axis of the container (the axis that passes through the top and bottom of the container). Other axes may be used with appropriate modification of the volume calculations. Use of any selected axis of rotation that passes through the central region (or another smooth, regular-shaped region) of the container would be an equivalent application of the present invention. In the preferred embodiment, the axis of rotation passes approximately through the center of the vial.

By rotating the vial at high speed, centrifugal force confines the air around the axis of rotation. This forms an air "pocket" also referred to as the air cylinder. In other words, the rotation forces the denser liquid away from the axis of rotation. This permits viewing the air volume Va within the cylindrical portion of the vial where it can be measured more accurately than when the air occupies an irregularly shaped portion of the vial. From the relationships above, the liquid volume can be determined as the sum of the air volume and the common volume.

Common Volume Calculation

Figure 4:
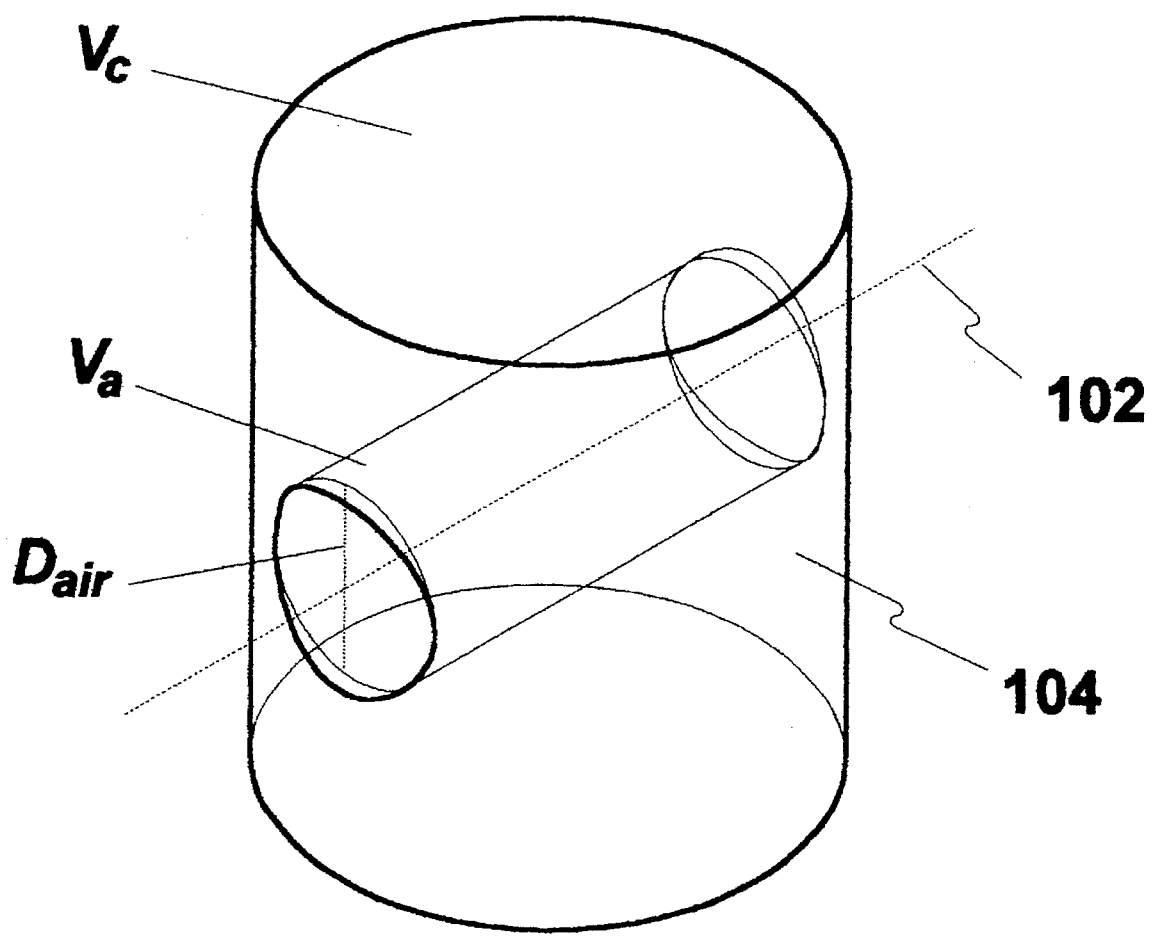
FIG. 4 is a conceptual, perspective illustration of the geometry of a generally cylindrical region of a container having a generally cylindrical air cylinder formed therein about an axis of rotation.

Note that the common volume occupies a generally cylindrical portion of the vial. Specifically, we can assume that the common volume is contained in a right circular cylinder of radius Dvial/2 and height Lup–Ldn. The volume of the cylinder is simply $\pi R^{2}*h$ (height). This cylinder is illustrated in FIG. 4. The air volume Va, also shown in FIG. 4, is contained in a solid composed of a right circular cylinder (symmetrical disposed about the axis of rotation of the vial) and two circular zones of the circular cylinder 104 defining the common volume. The axis of rotation of is indicated by dashed line 102 in FIG. 4. We shall refer to these as the common cylinder and the air cylinder. Thus, the diameter of the air cylinder pair and the length of the air cylinder plus the two circular zones is equal to the diameter of the vial. Techniques for measuring the diameter of the vial and the diameter of the air cylinder are described below.

Figure 3:
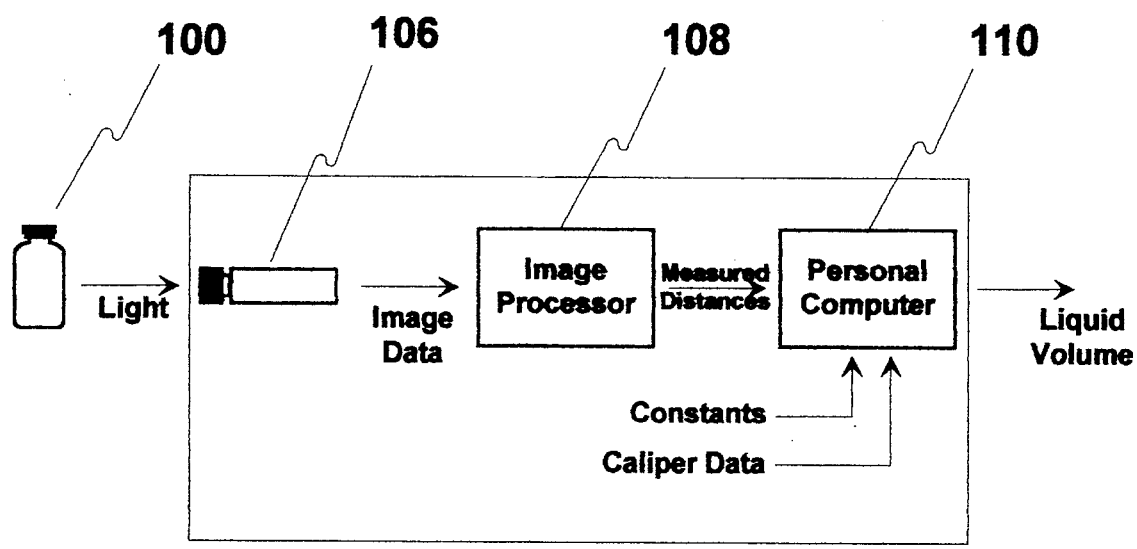
FIG. 3 is a block diagram illustrating a fill measurement process according to one aspect of the present invention.

The basic principles of vial geometry described above are used in a non-destructive fill measurement process illustrated by the block diagram of FIG. 3. Referring to FIG. 3, light from the vial 100 is received in a camera 106 where it is converted to electrical signals forming image data. The image data is processed in image processor 108 in order to determine measured distances, such as the upright and inverted liquid levels (Lup and Ldn, respectively) as well as the diameter of the air cylinder. This information is provided to processing means such as a personal computer 110. Additional information such as assumptions about vial geometries are also input to the personal computer for use in calculating the liquid volume according to the relationships described above. Calipers or the like may be used to measure vial diameter. In that case, caliper data is input to the personal computer 110. Alternatively, machine vision techniques for measuring vial diameter may be used as described below. Apparatus for implementing a fill measurement system according to another aspect of the invention is described next.

FIGS. 5–8 illustrate the mechanical components of one embodiment of the invention. Referring first to FIG. 6, the major subassembly units include an IR (infrared) light source (90), centrifuge spindle unit (92), centrifuge housing (64) and container holding fixture assembly (94). These subassemblies are shown installed in FIG. 5, along with a camera assembly (98) and motor (76) for driving the centrifuge spindle unit as further explained below.

Figure 7:
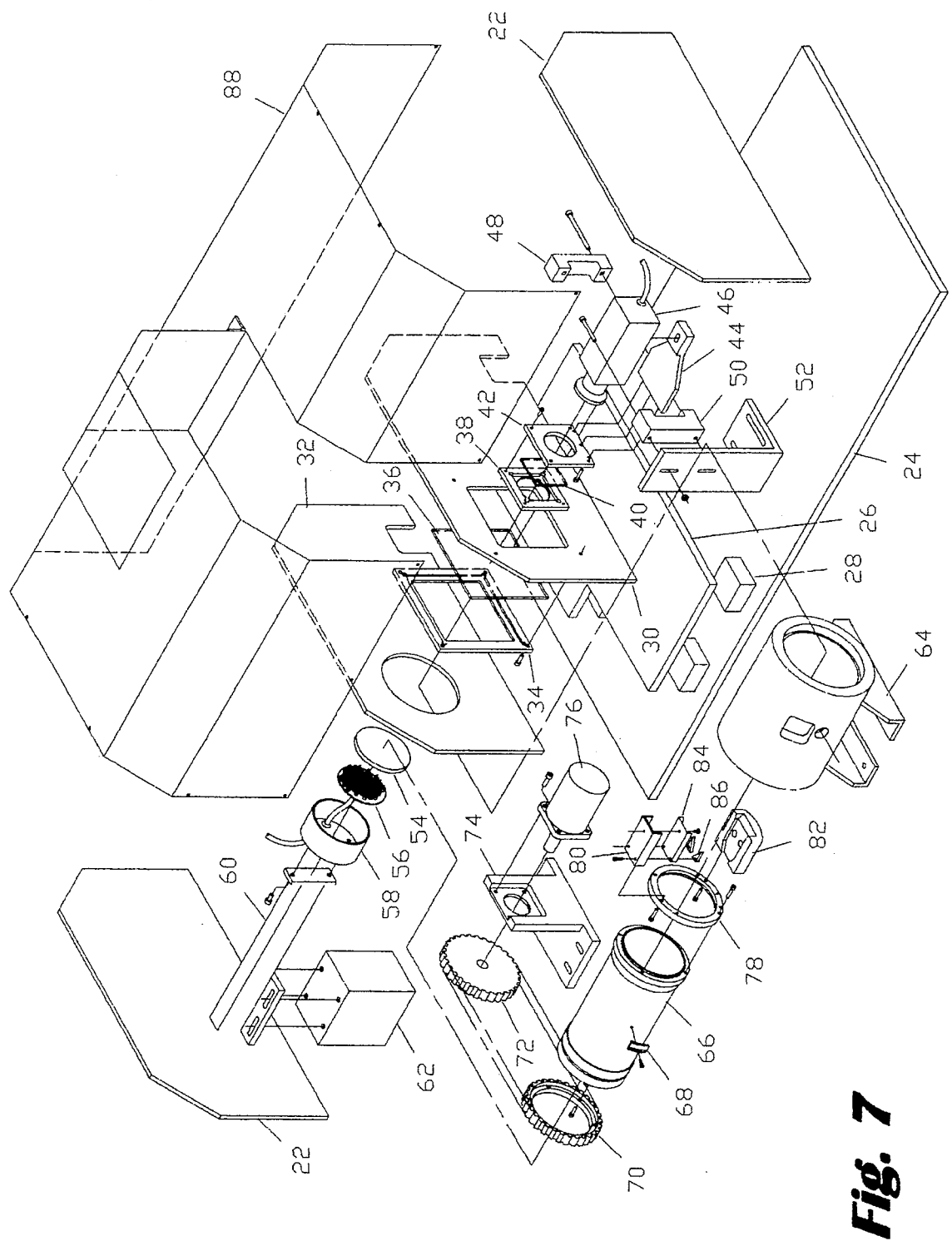
FIG. 7 is an exploded perspective view of the fill measurement system of FIG. 5.

Referring as well to FIGS. 7 and 8, the IR light source (90), with 1.7 volt 12 milliwatt 880 nm peak admission wavelength, uses infrared diodes to backlight the container. It is mounted on a cantilever support (60) and is suspended within the center of centrifuge spindle (92), as shown in FIGS. 6 and 8. The light source (90) projects light rays onto and through a container (100). The IR light source includes an IR light source housing (58) supported in place by a cantilever support member (60). The cantilever support is adjustably connected to a support spacer member (62). An IR light source element (56) is disposed within the housing (58) and covered by an IR light source panel (54). Panel (54) diffuses the infrared light so as to minimize "hot spots".

Container (100) is held in place at the end of the centrifuge spindle unit (92) by the container holding fixture assembly (94). The container holding fixture assembly (94) secures the container at the top and bottom, using flat springs for the top and ball plungers at the bottom of the container. This is done without obstructing the light source (90) or CCD camera (46) view, positioned on opposite sides of the container. (An alternative embodiment may have removable container holding fixture assemblies to fit different sized containers.) More specifically, the container holding fixture assembly includes a tooling mount (78) for connecting the fixture assembly to the centrifuge spindle unit (92); a top channel (80); a tooling lower channel (82); a tooling insert (84); and a tooling stop (86) all arranged as illustrated to receive and removably clamp the container in place so that it rotates together with the centrifuge spindle.

The IR light source (90) projects light from directly behind the container, which enables the camera assembly (98) to clearly detect the parameters of the container and distinguish the material contents from the air within the container. The camera assembly (98) includes an IR glass filter (40) and a CCD video camera (46) with a 12.5 mm lens. The IR filter (40) allows only light that is 780 nm and above to pass through, which enhances the contrast between colors to create a more clear image. The rays pass through the IR filter (40) and the image is captured by the CCD camera (46). The IR filter (40) is mounted with a filter holder (38) to an IR filter mount plate (42), which in turn is supported by an IR filter cantilever support plate (44), coupled to the camera support means described next. The camera is supported by a split camera bracket (48,50) which is supported in position by a centrifuge camera mount (52). The camera mount (52), in turn, is connected to the centrifuge sub-plate (24). The foregoing camera support members include means for adjusting the camera position so as to align it with the light source and centrifuge housing. The camera captures the image of the container in an up-right, inverted and rotating orientations.

An electric stepper motor (76) is mounted to the sub-plate (24) via centrifuge motor mount (74), and arranged to rotate the centrifuge spindle unit (92) responsive to motor drive or control signals so as to facilitate the acquisition of images of the container in the various positions as described. The centrifuge spindle unit (92) is a rotating device mounted on radial ball bearings. The container is rotated on a horizontal axis at high speed. The optimal rotation speed, that is the speed at which vibration is minimized and a well defined cylinder of air can be measured in the center of the container, varies depending upon the container size and volume of contents.

The centripetal force causes the heavier contents to move away from the axis, leaving a cylinder of air in the middle of the container. The video camera records the diameter of the air cylinder. In one example of a commercial embodiment of the invention, the centrifuge spindle unit (92) is driven by a 0.2 pitch ⅜" wide Kevlar® timing belt attached to the centrifuge pulleys (70 & 72), which are powered by a 1.8° hybrid micro-stepping motor (76). A suitable motor controller (not shown) communicates via RS 232 interface with the computer described below. In an alternative embodiment, a brushless servo motor may be used.

The centrifuge housing (64) encases the centrifuge spindle (92) and has a sensor (96) that feeds back to the motor controller. The sensor (96) aligns with the centrifuge position target (68) located on the centrifuge spindle (66) to act as a home position so the controller stops the motor (76) with the container in an upright position.

The mechanical assembly further includes a generally planar, rigid centrifuge internal support rib (30) having an aperture through which light passes from the centrifuge assembly to the camera. A clear glass panel (36) is mounted to the centrifuge side of the support rib by a centrifuge glass retainer (34) and associated hardware. In this way, the camera and related components are completely enclosed between end plate (23), support rib (30), sub-plate (24) and cover (88) to protect them even when the system is in use. A centrifuge internal machine guard (32) similarly protects the centrifuge housing, motor and related components from access during normal operation.

The centrifuge cover (88) preferably is formed of 300 series stainless steel and forms a protective enclosure for the system. The centrifuge cover (88) has a hinged door (89) for loading and unloading of the container. The centrifuge sub-plate (24) and centrifuge end panels (22,23) are formed of 6061-T6 aluminum plate. Centrifuge sub-plate (24) is a mounting plate for the system sub-assemblies. Centrifuge base plate (26) supports the centrifuge housing (64). The centrifuge base plate is spaced above the centrifuge sub-plate (24) by base plate spacers (28), all formed of strong, rigid material such as metal.

Figure 9:
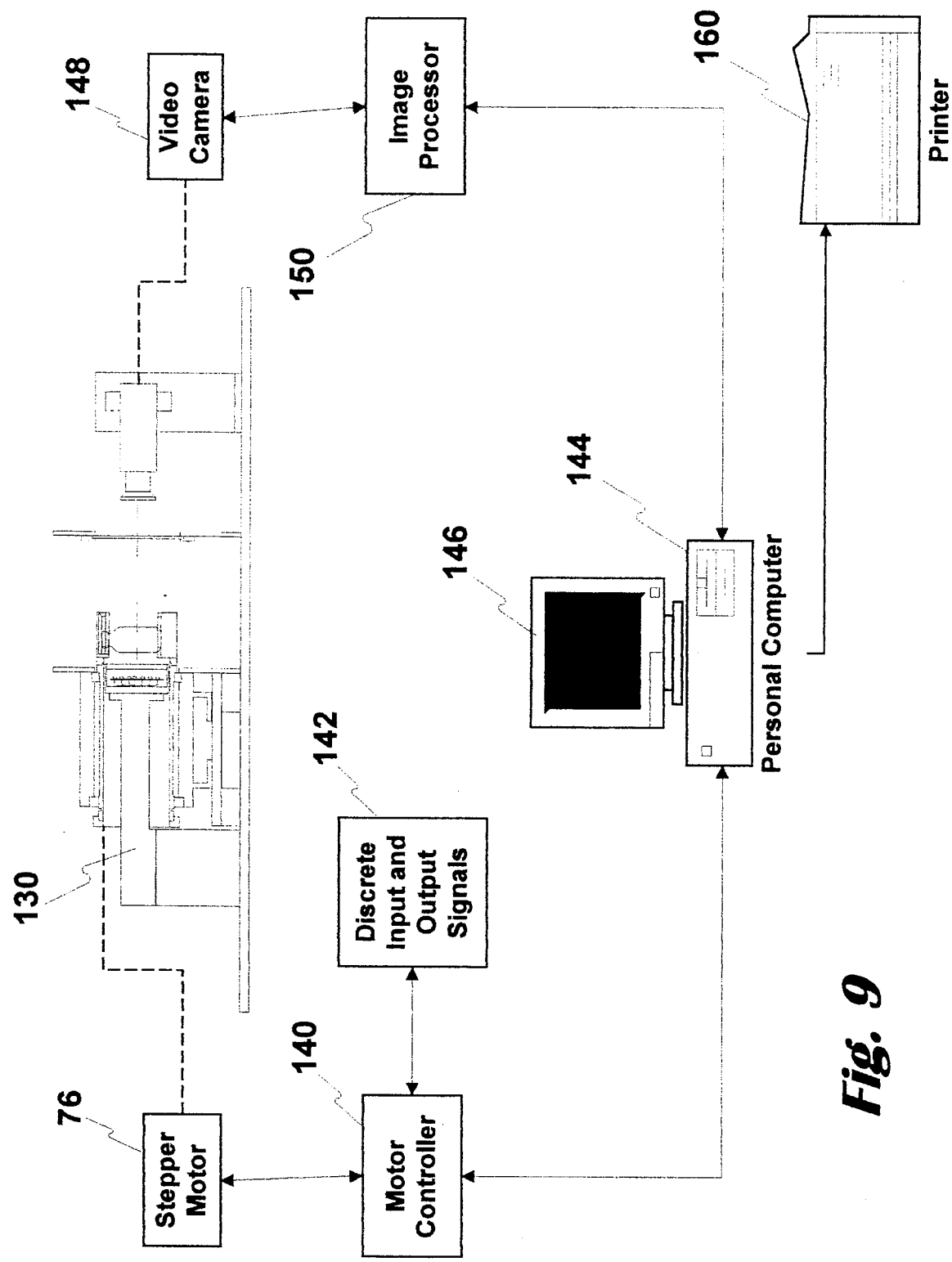
FIG. 9 is a functional component block diagram of a non-destructive fill measurement system according to another aspect of the invention.

FIG. 9 is a functional component block diagram of a fill measurement system according to the present invention. In FIG. 9, a mechanical assembly (130) corresponds to the apparatus described with regard to FIGS. 5–8. The mechanical assembly (130) includes a stepper motor (76), operatively coupled to a motor controller (140). In one commercial embodiment of the invention, the stepper motor and motor controller are those sold as a unit by Compumotor of Rohnert Park, Calif., model SX-83-135. Alternatively, a servo motor and appropriate controller may be used. These are also available commercially off-the-shelf from Compumotor. The motor controller provides discrete input and output signals (142), which may include, for example, emergency stop, jog motor, etc. The emergency stop function is wired to a suitable button on the outside of the system housing.

The motor controller (140) interfaces with a computer (144), such as a personal computer, via a standard RS-232 interface, for example. The personal computer may comprise a 486-class microprocessor or the like with standard peripheral equipment, including 120MB hard drive and 8MB of RAM. The computer runs user application software, including a Host Program, for operating the measurement apparatus (130) as described herein, including control of the motor through the motor controller hardware (140). Preferably, the Host Program is implemented using Microsoft® Visual C++ language, commercially available, although various other languages may be used as well. The particulars of the Host Program can be arranged by one of ordinary skill in the art in view of the disclosure herein.

The computer (144) is coupled to a monitor (146) as is conventional for user interface purposes. Information is displayed on the monitor under control of the Host Program in conjunction with the computer operating system in the conventional manner.

The assembly (130) includes a video camera, indicated as video camera (148) in FIG. 9. The video camera (148) is coupled to an image processor (150) for capturing images of the container under examination. The image processor may be a commercially available vision input system such as the Allen-Bradley CVIM Configurable Vision Input Module, catalog no. 5370-CVIM, available from Allen-Bradley Company. The CVIM system includes apparatus for capturing image data from a camera and displaying that data on a monitor or other visual display screen. Another machine vision system suitable for acquiring the measurements described herein is the Cognex 5000 series of Plug-In Machine Vision Systems for the ISA bus. These machine vision systems include libraries of vision software tools and are compatible for operation with standard personal computer systems, such as those that operate under the DOS or Windows operating systems. These systems are commercially available from Cognex Corp. of Needham, Mass. A separate, dedicated monitor may be used, or video output may be directed through the personal computer display screen (146) in a window.

The CVIM system includes machine vision software tools including a variety of measurement gauges. Gauges can be used to measure objects, count objects, count edges on an object and other machine vision operations. In the present application, the CVIM system is controlled by the Host Program to measure the upright liquid level, inverted liquid level and air cylinder diameter, as these terms are described above. Specifically, the video camera is aligned with the axis of rotation of the container (102 in FIG. 4), so that the axis of rotation always falls at the center of the acquired video image. An origin, namely a horizontal line, is provided in the image, relative to which the liquid levels are measured by the gauge software. The origin line may be implemented, for example, by providing a wire over the light source.

Since the axis of rotation of the container lies at the center of the image, air cylinder diameter (or radius) conveniently may be measured from that center point. Preferably, many measurements are taken of the air cylinder diameter, for example 50–100 measurements, and the results are averaged to determine the diameter. These measurements preferably are taken at various places, i.e. at various angles relative to the horizontal origin.

Although provision may be made in the Host Program to receive container outside diameter information from the keyboard, the system may also be configured to automate measurement of the container outside diameter. The image processor (CVIM) software tools can be used to make that measurement. Preferably, the outside diameter is measured at several different heights to determine the exact outside shape of the container. Even that information, however, is of limited value unless constant wall thickness is assumed, since it is interior volume that is of interest. Wall thickness generally is known from manufacturer data and is input to the Host Program from the keyboard. Wall thickness may be measured manually, as well, but as noted above it actually varies, especially in molded vials as compared to the extruded tube variety. The actual interior configuration of a container may be measured using scanning techniques described below with regard to FIG. 11.

Figure 10:
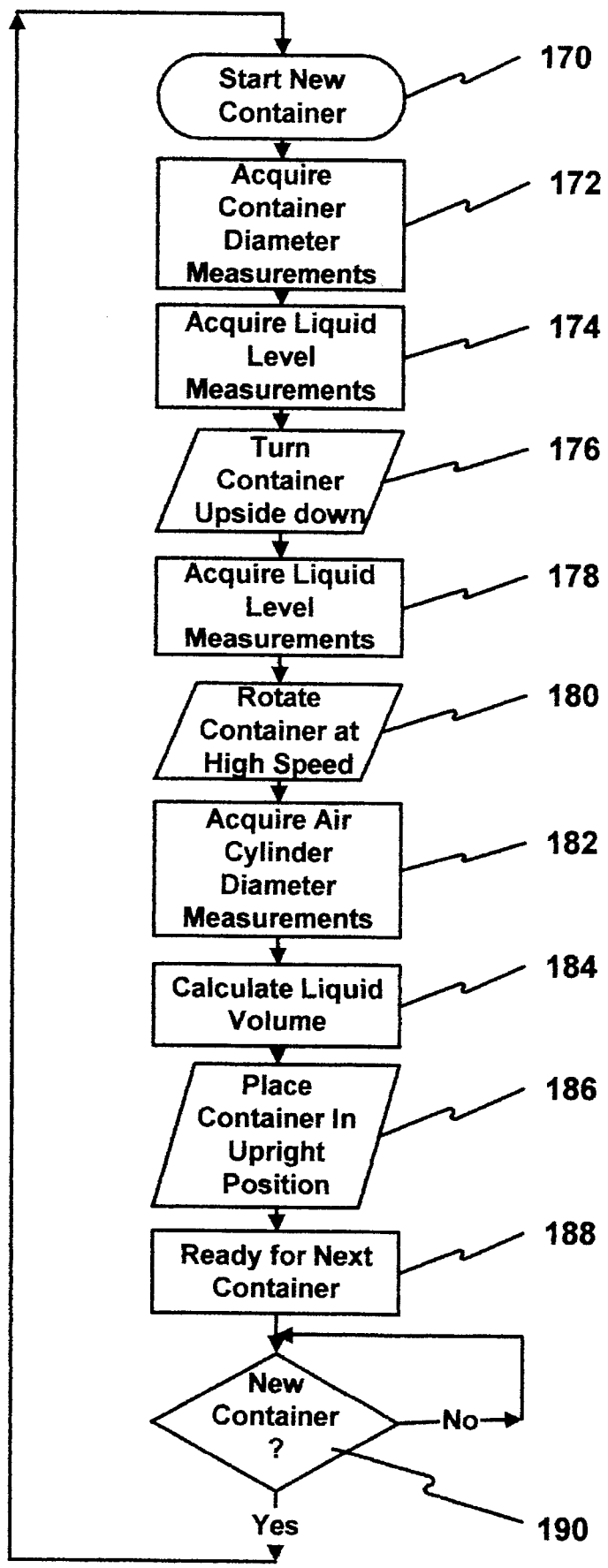
FIG. 10 is a system software flow diagram illustrating operation of the system of FIG. 9

FIG. 10 is a Host Program flow diagram illustrating operation of the fill measurement system of the present invention. In FIG. 10, it may be noted that data acquisition and calculation steps are indicated by rectangular boxes, whereas motor activities, i.e., moving the container, are indicated by parallelograms. At the outset, the fill measurement system is calibrated and initialized. It may be calibrated, for example, by use of test containers having well-known fill volumes. The camera is aligned as mentioned previously.

In step (170), an operator mounts a container for examination. Specifically, the operator accesses the mechanical apparatus by opening hinged door (89), and installs the container in the container holding fixture assembly (94—FIG. 6). The operator may indicate to the system that this has been completed by an appropriate entry at the keyboard, or simply by closing the access door.

In step (172), the system acquires container diameter measurements. The operator may make these measurements manually and enter them at the keyboard as described above. Alternatively, container diameter measurements may be acquired by the system using the scanning laser technique described below.

In step (174), the system acquires liquid level measurements. Specifically, the container initially is mounted in the upright orientation. Thus, the machine vision apparatus can measure the upright liquid level.

In step (176), the software activates the stepper motor through the motor controller (see FIG. 9) to invert the container. Next the system acquires the inverted liquid level (178).

The software then controls the motor through the motor controller to rotate the container at high speed. In step (182), while the container is rotating, the machine vision subsystem acquires air cylinder diameter measurements as previously discussed.

In step (184), the system calculates liquid volume as described previously. At this time the container is decelerating to a stop and, in step 186, is returned to the upright position. Software waits for an indication that it is ready to process the new container (decision step 190) and proceeds accordingly.

Figure 11:
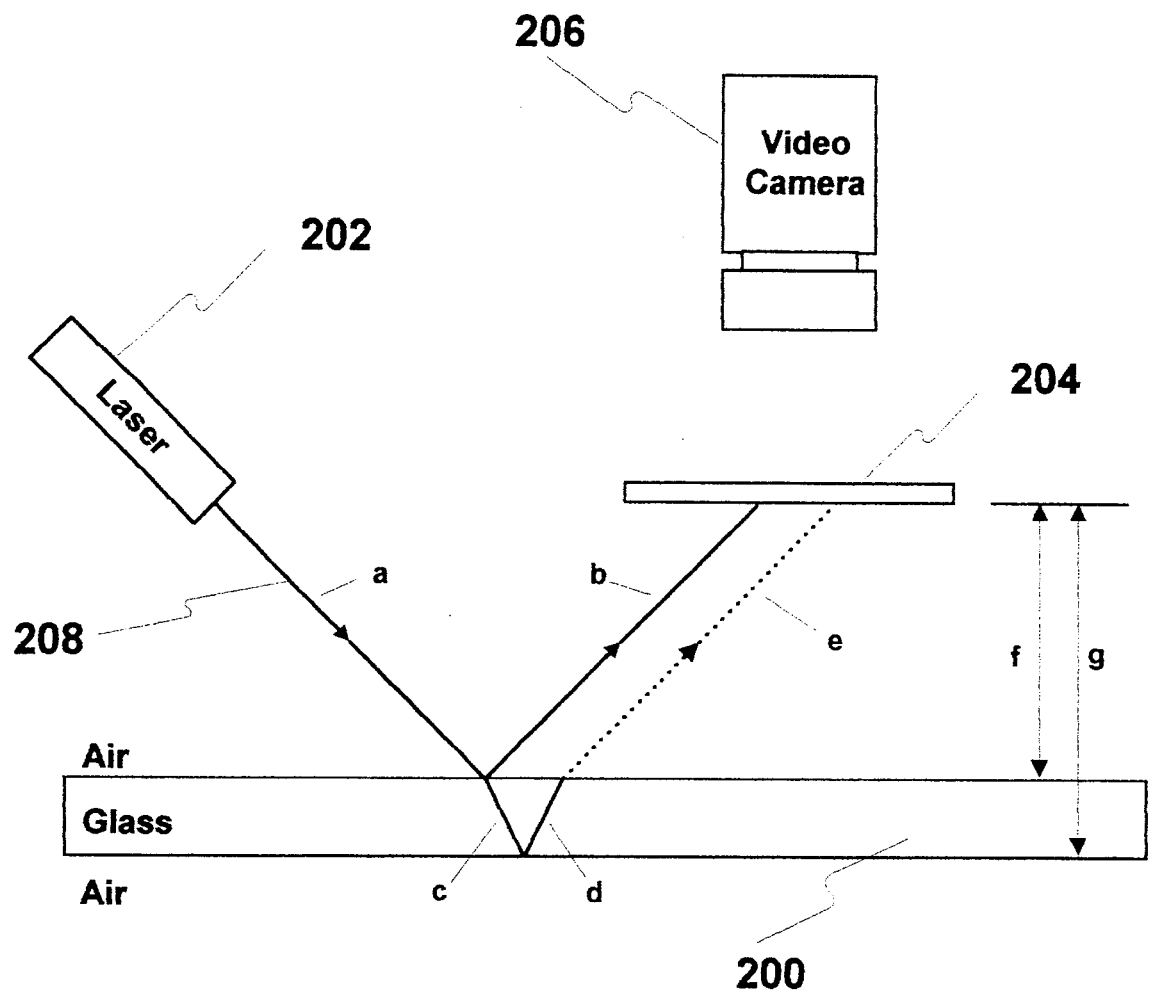
FIG. 11 is a diagram of a laser scanning technique for measuring container wall thickness.

FIG. 11 is a diagram that illustrates the principles involved in a laser scanning technique to measure container wall thickness (200). The scanning technique assumes that the laser (202), opaque screen (204) and video camera (206) are all fixed in position relative to one another and that these positions are known. It is also assumed that the glass surfaces are relatively smooth so that the angles of reflection and refraction are predictable.

Following the light path (208), a fine beam (a) is emitted from the laser and impinges on the outer glass surface at a known angle. A portion of (a) is reflected at an equal and opposite angle (b) and strikes the opaque screen at a point that can be located by the video camera. The remaining portion of (a) enters the glass (c) and travels downward toward the inner surface at a known angle of refraction. When (c) reaches the inner surface, a portion (not shown) continues to propagate downward while the remainder (d) is reflected internally at an equal and opposite angle. When (d) reaches the outer glass surface, a portion (e) propagates upward toward the opaque screen while the remainder (not shown) is internally reflected again. This process continues until the remaining light energy dissipates to zero. The second order beam (e) travels parallel to the first order beam (b) and also impinges on the screen so that it can be located by the video camera.

Because the fixed distances between the laser, the opaque screen and the camera are known, and because we assume the glass surfaces to be relatively uniform and at a known angle of orientation, one can determine the distances (f) and (g) through trigonometric relations to the points where (b) and (e) appear on the opaque screen. These measurements can be made by the image processor apparatus described above, and the necessary calculations carried out by the computer under control of the Host Program.

The described methods and apparatus may be used to scan several points on the glass container to determine both its outer diameter and the glass wall thickness. This in turn enables us to calculate the inner diameter which is the boundary of the volume that contains the liquid.

Figure 12:
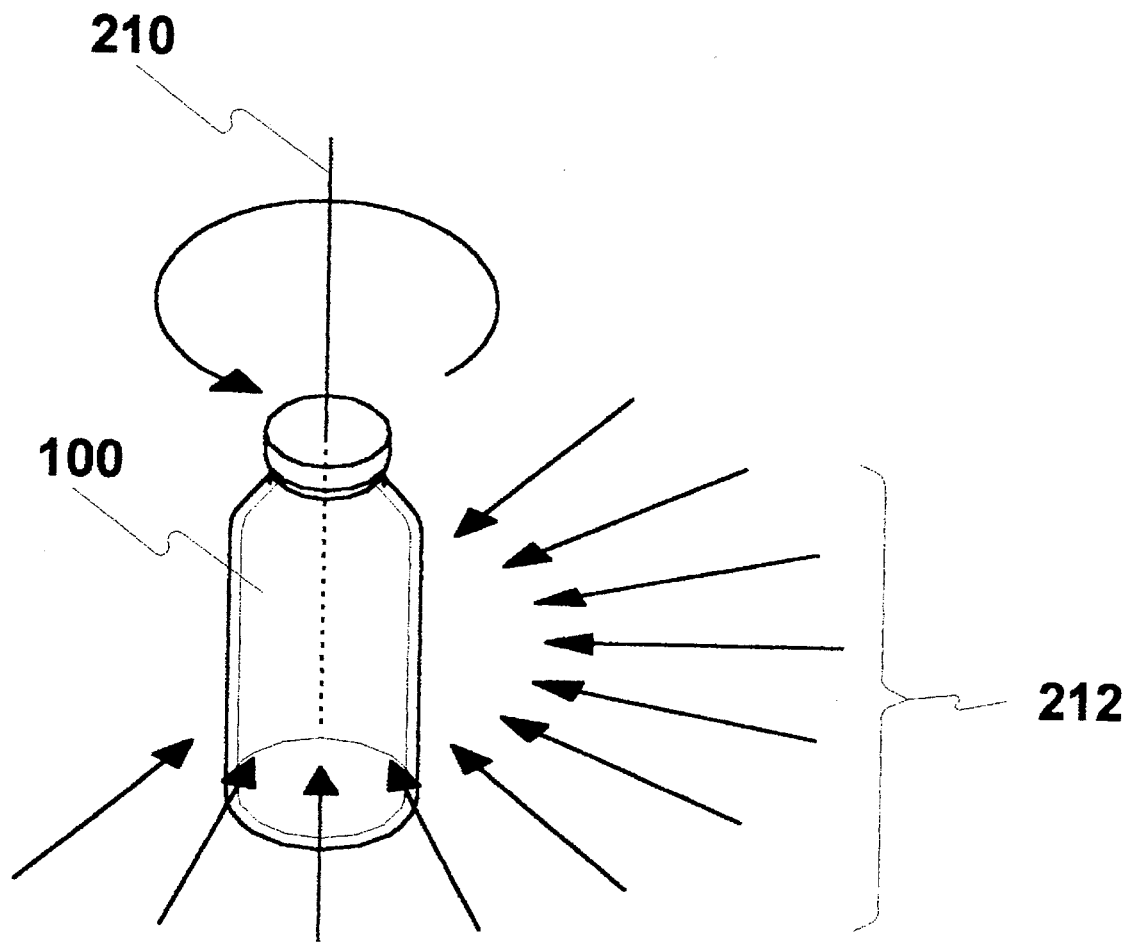
FIG. 12 is a diagram illustrating techniques for measuring container outside diameter.

FIG. 12 is a diagram illustrating the enhanced diameter measurement technique. The fluid container (100) is automatically rotated about its central, longitudinal axis (210) so that it can be viewed in multiple, discrete orientations. In the present invention, images are captured by an electronic video camera that remains in a fixed position relative to the rotating container. This allows the camera to view the container from several angles (212) and acquire diameter measurements that describe container geometry more accurately than measurements taken from a single angle. The Host Program can be arranged to control the apparatus described above so as to acquire several such measurements automatically and in a short time. The diameter measurements can be combined, for example by using a mean or an average figure as the container diameter, assuming the container to be cylindrical for modeling purposes. Alternatively, more precise modeling can be achieved by taking the multiple measurements into account to form a more precise model of the container that is not necessarily perfectly cylindrical.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A non-destructive method of determining a fill volume of a first fluid in a sealed container that also contains a second fluid having a lower density than the first fluid, the container having a substantially symmetrical central region, comprising the steps of:

determining a common volume within the central region of the container intermediate an upright fluid level and an inverted fluid level, such that the first fluid fill volume equals a sum of the second fluid volume plus the common volume;

determining the second fluid volume; and summing the second fluid volume and the common volume to determine the first fluid fill volume.

2. A method according to claim 1 wherein said determining the second fluid volume includes rotating the container about a selected axis of rotation so as to confine the second fluid to the central region of the container, and measuring the second fluid volume within the central region while the container is rotating.

3. A method according to claim 2 wherein said rotating step includes selecting a speed of rotation such that the second fluid volume forms a substantially cylindrical pocket symmetrically disposed about the axis of rotation, the pocket being substantially surrounded by the first fluid; and said measuring the second fluid volume includes measuring a size of the pocket while the container is so rotating.

4. A method according to claim 3 wherein the selected speed of rotation is within a range of approximately 200 to 7000 rpm.

5. A method according to claim 3 further comprising providing a machine vision system including an electronic imaging means for capturing an image of the pocket along the said axis of rotation, and wherein said measuring the size of the pocket includes measuring a diameter of the pocket from the captured image.

6. A method according to claim 1 wherein said determining the common volume includes:

determining an inside diameter of the container in the central region;

positioning the container in an upright orientation;

measuring the upright fluid level at a first interface of the first fluid and the second fluid;

inverting the container;

measuring the inverted fluid level at a second interface of the first fluid and the second fluid; and calculating the common volume based upon the inside diameter and a distance between the upright and inverted fluid levels.

7. A method according to claim 6 wherein said measuring the upright and inverted fluid levels includes providing a machine vision system including an electronic imaging means for capturing an image of the container; capturing an image of the container in each of the upright and inverted orientations; and determining said fluid levels from the respective captured images.

8. A method according to claim 7 further comprising providing a predetermined origin line in the captured image, and measuring the said fluid levels relative to the origin line.

9. A method according to claim 7 further comprising directing a source of electromagnetic radiation having a desired wavelength through the container toward the imaging means; and filtering electromagnetic radiation entering the imaging means so that only electromagnetic radiation having substantially the desired wavelength enters the imaging means.

10. A method according to claim 9 further comprising obscuring a predetermined portion of the electromagnetic radiation source so as to provide an origin in the captured images, and wherein said determining the fluid levels includes gauging a distance in the images intermediate the respective fluid levels and the origin.

11. A method according to claim 9 wherein the source of electromagnetic radiation comprises an infrared light source.

12. A method according to claim 7 wherein said determining the inside diameter includes providing a predetermined wall thickness; measuring the outside diameter of the container; and calculating the inside diameter as the outside diameter less the wall thickness.

13. A method according to claim 1 wherein the first fluid comprises a liquid and second fluid comprises air.

14. A method according to claim 1 wherein the container has a total volume of approximately in a range of 1 to 1000 milliliters.

15. A method according to claim 1 wherein the container comprises a generally tubular glass vial.

16. A method according to claim 15 wherein the glass vial is molded.

17. A method according to claim 1 wherein the container comprises a glass vial and the first fluid is a parenteral drug.

18. A non-destructive fill volume measurement system for determining a volume of a first fluid in a sealed container, the container also containing a second fluid having a lower density than the first fluid, comprising:

means for holding a container in a selected position, the container having a generally symmetrical shape defining a central longitudinal axis;

means for measuring an upright fluid level while the container is upright and for measuring an inverted fluid level while the container is inverted;

means for determining a common volume of the container intermediate the upright and inverted fluid levels;

means coupled to the holding means for rotating the container about a selected axis of rotation normal to the longitudinal axis and substantially centered through the container so as to force the contents of the vial away from said axis of rotation, whereby the second fluid forms a substantially stable, generally cylindrical pocket about the said axis of rotation;

means for determining a volume of the pocket while the container is rotating; and means for determining a volume of the first fluid as a sum of the common volume and the pocket volume.

19. A volume measurement system according to claim 18 wherein the means for measuring the upright and inverted fluid levels includes a machine vision means for capturing and processing images of the container.

20. A volume measurement system according to claim 18 wherein the means for determining a volume of the pocket includes machine vision means for capturing and processing images of the container while the container is rotating.

21. A volume measurement system according to claim 20 further comprising lighting means arranged for illuminating the container in support of the machine vision means.

22. A volume measurement system according to claim 21 wherein the lighting means includes an infrared light source.

23. A volume measurement system according to claim 22 wherein the infrared light source includes an array of infrared light-emitting diodes and a diffusion panel overlying the array.

24. A non-destructive liquid fill volume measurement system for determining a volume of a liquid in a sealed container, the container also containing air, the system comprising:

centrifuge means for holding and rotating a container about a predetermined axis of rotation that extends through the container; and machine vision means for capturing and processing an image of at least a central portion of a container mounted in the centrifuge means, the machine vision means including a camera alignable along the said axis of rotation for forming said image of the container.

25. A volume measurement system according to claim 24 further comprising image processing means for measuring an air pocket formed in the container while the container is rotating by gauging the said image.

26. A volume measurement system according to claim 25 further comprising a light source arranged so as to direct light through the container toward the camera.

27. A volume measurement system according to claim 26 wherein the light source includes an infrared light source and further comprising means disposed in front of the camera for filtering visible light, so that the said image is formed responsive only to light provided by the infrared light source.

28. A volume measurement system according to claim 27 wherein the infrared light source includes an array of infrared light-emitting diodes and a diffusion panel overlying the array so as to diffuse hot spots.

29. A volume measurement system according to claim 24 wherein the centrifuge means includes a centrifuge housing, a centrifuge spindle rotatably disposed in the centrifuge housing and a motor operatively coupled to the centrifuge spindle for rotating the spindle and thereby rotating the container.

30. A volume measurement system according to claim 29 further comprising a motor controller for controlling the motor, and wherein the motor comprises a selected one of a stepper motor and a servo motor.

* * * * *